Aug. 16, 1960   J. G. SEVCIK   2,948,905
ROLL-AWAY BEDS
Filed Nov. 5, 1957   3 Sheets-Sheet 1
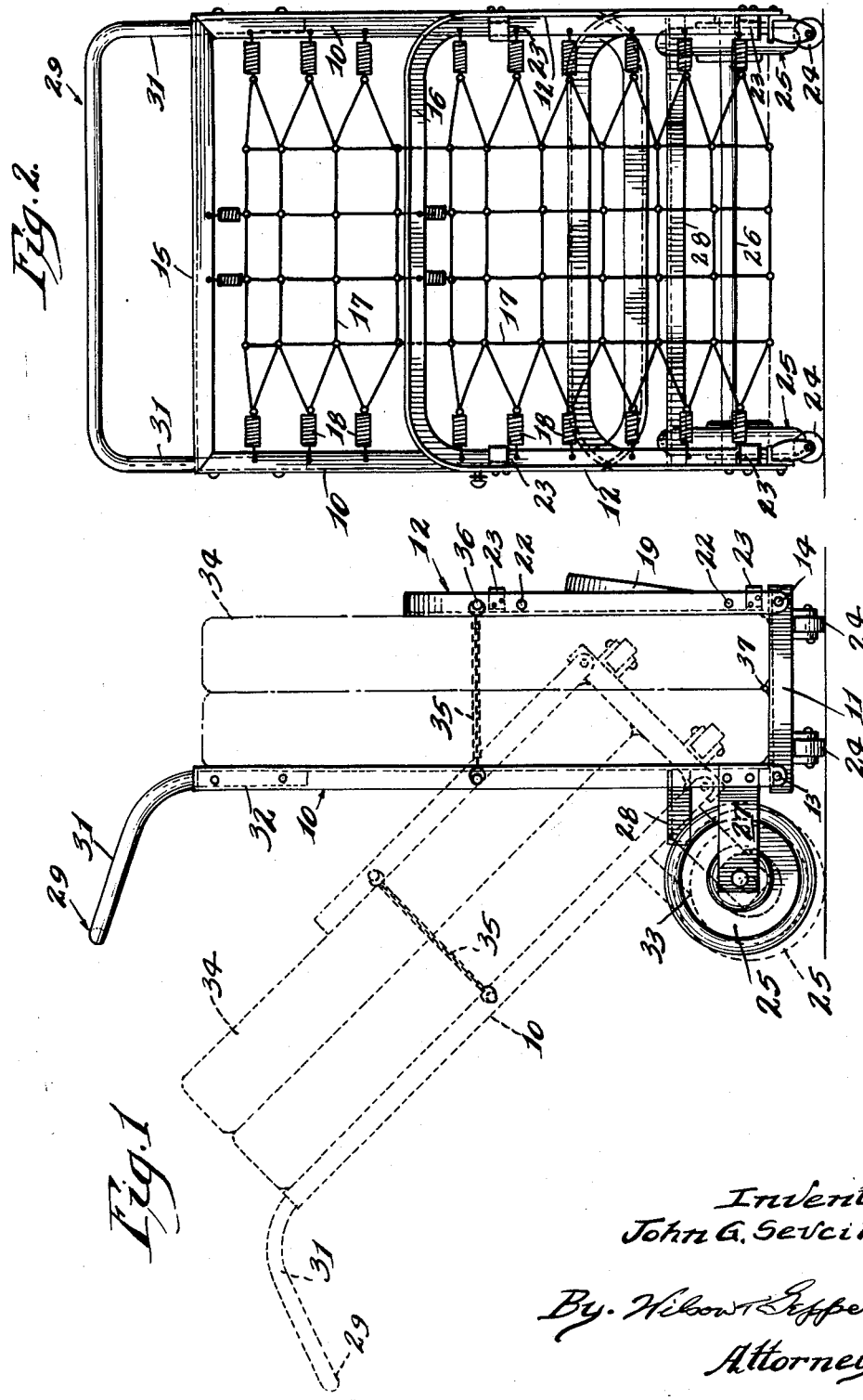
Inventor:
John G. Sevcik.
By. Wilson T Geppert
Attorneys.

Aug. 16, 1960   J. G. SEVCIK   2,948,905
ROLL-AWAY BEDS
Filed Nov. 5, 1957   3 Sheets-Sheet 2
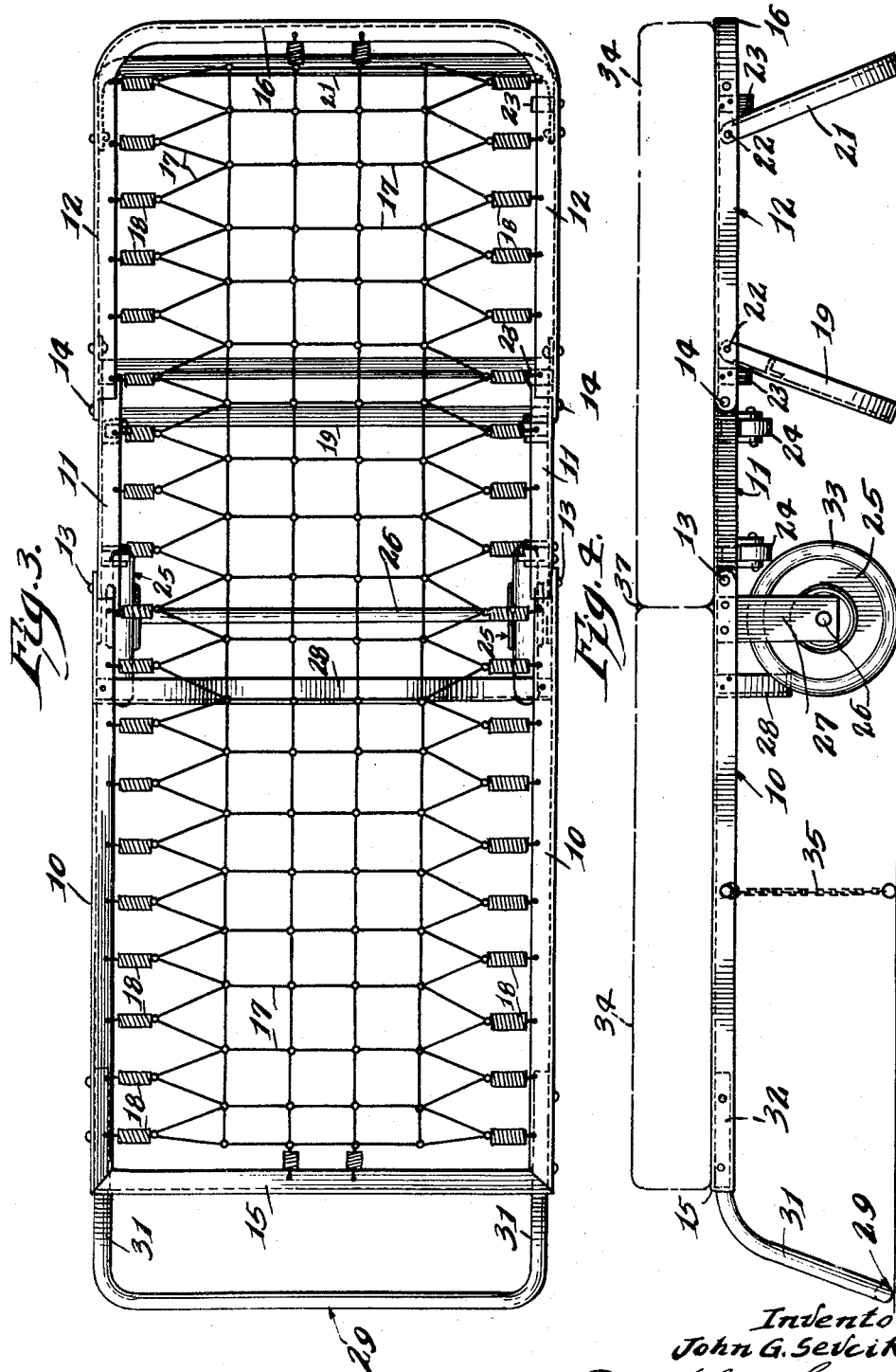
Inventor:
John G. Sevcik.
By. Wilson & Geppert
Attorneys.

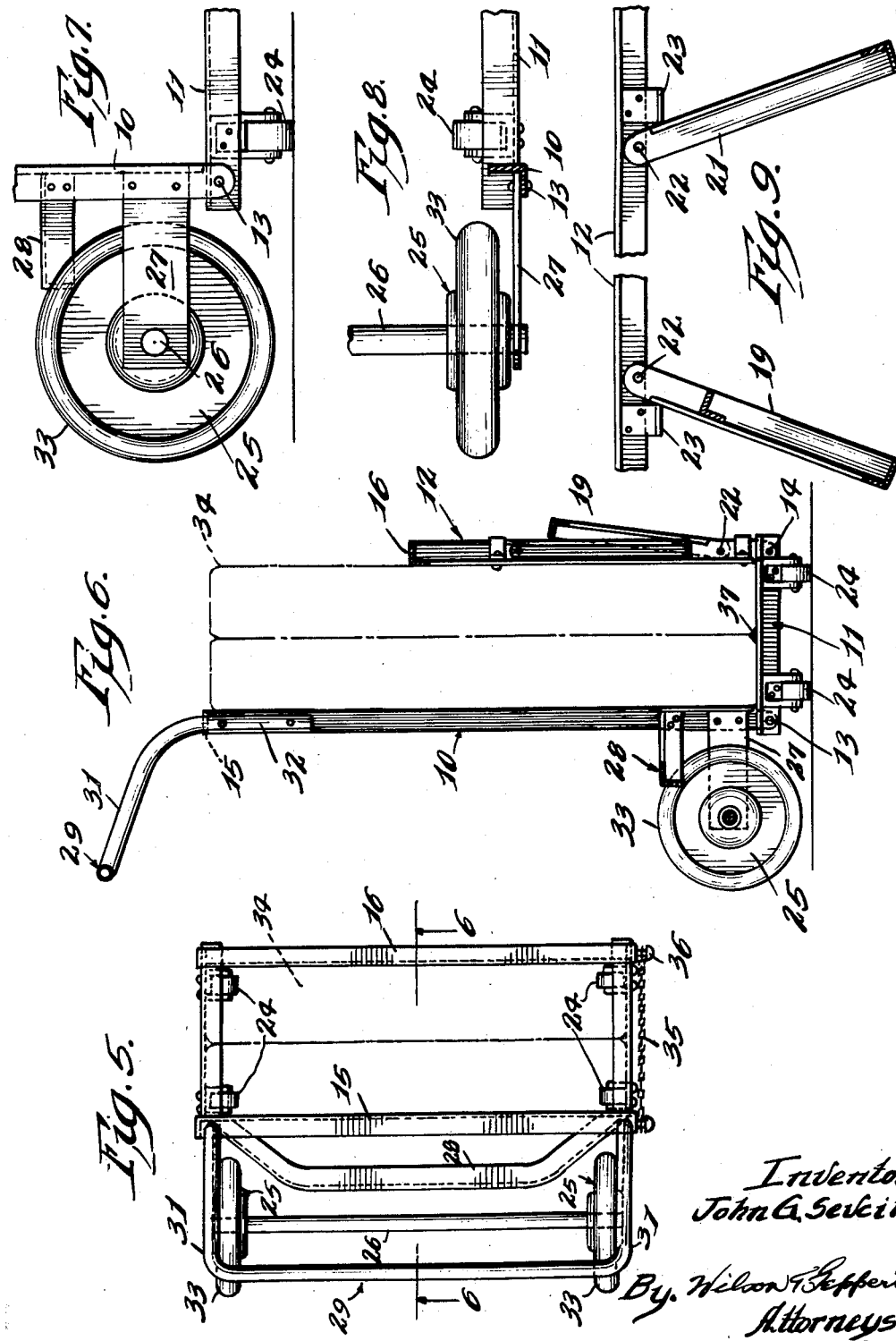

United States Patent Office 2,948,905
Patented Aug. 16, 1960

2,948,905

ROLL-AWAY BEDS

John G. Sevcik, Berwyn, Ill., assignor to Burton-Dixie Corporation, Chicago, Ill., a corporation of Delaware Filed Nov. 5, 1957, Ser. No. 694,628

3 Claims. (Cl. 5—111)

The present invention relates to a novel portable roll-away bed capable of being moved about with substantially greater ease and less effort than prior types of roll-away beds.

While prior types of roll-away beds may be folded for storage when not in use and when so folded, may be moved about in upright position upon casters, movement to or from storage or from room to room requires substantial effort. It is, therefore, an important object of the present invention to provide a roll-away bed with novel means for facilitating transportation of the bed whereby it may be tilted back from the vertical and readily and easily moved about on a pair of relatively large wheels by means of a handle in a novel manner.

The present invention further comprehends a novel roll-away bed having in addition to the usual casters a pair of relatively large wheels disposed inwardly of the sides or within the width of the bed frame to permit the assembly to be readily and easily moved through narrow doorways or other passageways.

Another important object of the present invention is the provision of a novel foldable bed frame for a roll-away bed including a pair of relatively large rubber-tired wheels so mounted on the frame as to be elevated above the floor when the folded frame is supported in upright position as when in storage or not in use, and a handle for tilting the folded bed whereby the bed rests upon said wheels and in which position the bed may be easily rolled about or transported from room to room and up and down stairs with little effort by a housewife or maid.

A further object is the provision in a roll-away bed of a handle and a pair of relatively large wheels for rolling the bed from place to place, said wheels and the handle providing supports for the bed when the latter is opened for use.

Further objects are to provide a construction of maximum simplicity, efficiency, economy and ease of assembly and operation, and such further objects, advantages and capabilities as will later more fully appear and are inherently possessed thereby.

In the drawings,

Figure 1 is a view in end elevation of the novel assembly of a roll-away bed folded for storage or when not in use and showing the mattress in dotted outline, the assembled bed being also shown in dotted outline in tilted position in which position it is rolled away to another location for subsequent use or storage.

Figure 2 is a view in front elevation thereof but with the mattress removed.

Figure 3 is a top plan view of the bed assembly other than the mattress opened for use as a bed.

Figure 4 is a view in side elevation of the opened bed with the mattress shown in dotted outline.

Figure 5 is a top plane view of the assembly of Fig. 1.

Figure 6 is a view in vertical cross section taken in a plane represented by the line 6—6 of Fig. 5 and viewed in the direction of the arrows.

Figure 7 is a fragmentary enlarged view in end or side elevation of the lower rear end of the assembly of Fig. 1.

Figure 8 is a fragmentary top plan of the wheel and caster assembly of Figure 7 and showing the manner of mounting and locating a wheel relative to the sides of the bed frame.

Figure 9 is a fragmentary view part in side elevation and part in vertical cross section through a section of the frame and supporting leg assembly opened for supporting one end of the bed frame.

Referring in detail to the drawings and to the novel illustrative embodiment therein shown, the present invention comprises a roll-away bed having three articulated frame bed sections 10, 11, and 12 which are pivotally connected at 13 and 14. Each bed frame section comprises side angle members with the end section 10 having its side members connected at its outer end by an angle cross piece 15 and the other end section 12 connected at its outer end by an angle or cross piece 16. Mattress supporting spring elements consisting of conventional wire link fabric 17 connected to the frame sections by means of coil springs 18, are provided as shown in Figs. 2 and 3.

Pivotally mounted on the end section 12 are depending substantially U-shaped supporting legs 19 and 21 with the ends of these legs pivotally connected at 22 and with these legs capable of being folded onto the underside of the section 12 when not in use as shown in Figs. 1, 2 and 5, or extended to depending position to provide floor supporting means as shown in Figs. 4 and 9. In this latter position the legs 19 and 21 are disposed at such angle with respect to the bed frame as to rigidly support the bed at this end and each leg is held against collapse in one direction by stops 23 provided on one or both of the side members of the bed frame section 12.

On each side frame member of the intermediate frame section 11, are mounted spaced casters 24 for supporting the roll-away bed when in folded position (Figs. 1, 2 and 5) and when not in use or made ready for storage. These casters permit the collapsed bed to be moved laterally in the manner in which prior types of roll-away beds have been moved about.

Mounted upon the end section 10 and adjacent each side thereof but spaced inwardly from the sides of the bed frame are two relatively large, rubber-tired wheels 25 for easy transportation of the bed. Each wheel has its hub carried and journaled upon and adjacent an end of a transverse shaft 26 with each of the extreme ends of this shaft journaled in an end of a supporting bracket 27 rigidly affixed at its other end to the side frame members of the end frame section 10 adjacent its pivotal mountings 13. A substantially U-shaped brace member 28 has its opposite ends also rigidly affixed to the side frame members of the frame section 10.

To facilitate movement of the roll-away bed, the end frame section 10 is provided with a substantially U-shaped handle 29 comprising a cross bar and bent legs 31 with the end 32 of each leg projected through the cross piece 15 and aligned with and conformably received and rigidly connected to the side frame members of the end section 10. This handle 29 also provides a support for one end of the bed when the latter is opened for use as in Figures 3 and 4, and when the bed is folded and tilted back to the dotted line position of Fig. 1, it provides a handle for moving the folded bed to a position of use or storage.

When the collapsed bed is in the full line position of Fig. 1 and in the position shown in Figs. 2, 6, and 7, it is supported wholly upon the casters 24 but when tilted rearwardly, it is supported wholly upon the relatively large wheels 25 each of which is provided with a rubber tire 33 to facilitate rolling movement. Also when in the folded position for non-use and with the contained mattress or pad 34 folded between the folded bed frame sections, a chain 35 is connected at one end to the end frame section 10 and provided at its other end with a loop for connection to a pin or projection 36 on the other end frame section 12 to retain the folded frame sections 10 and 12 in upright relation.

The large, rubber-tired wheels 25 being disposed within the width or confines of the bed frame, permits the folded assembly to be moved through narrow doorways or other access openings or passageways. Furthermore, by means of these large wheels, a housewife or maid may transport or move the bed assembly to any location with little effort. All that is required is for the housewife to tilt the assembly from the position shown in Figs. 1 and 6 to that shown in dotted outline in Fig. 1. This tilting is readily and easily accomplished by placing one foot against the U-shaped brace member 28 and pulling rearwardly upon the handle 29 and when so tilted, the bed assembly can be moved about and directed with little effort to any location desired. Furthermore, it may be moved up and down steps by one person, which could only be accomplished with the prior types of roll-away beds provided with casters by lifting of the relatively heavy bed assembly.

The mattress or pad 34 is split and hinged at 37 to facilitate its being folded into a compact unit of but double thickness and when opened it is of a length corresponding to the over-all length of the frame assembly. The novel bed assembly when unfolded and extended into a bed, provides a rigid assembly in which the handle 29 and the relatively large wheels 25 engage the floor and provide supporting means for the bed.

From the above description and the disclosure in the drawings, it will be apparent that the present invention comprehends a novel portable or roll-away bed assembly provided with means for appreciably lessening the effort required for moving the folded bed to various locations for use or storage, and in which such means also supports the bed when it is unfolded or opened for use.

I claim:

1. In a roll-away bed, a bed frame therefor comprising articulated end sections and an intermediate horizontal section with the end sections folded inwardly and upwardly to upright position when the bed is not in use and to support a mattress folded between the end sections and resting on the intermediate section, means for pivotally connecting the adjoining ends of said end sections to the ends of said intermediate section, floor-engaging casters on said intermediate section for supporting the folded bed frame in upright position when not in use, a pair of rearwardly projecting spaced brackets each mounted at one end on a side of one of said end sections adjacent to but above its pivotal connecting means, a shaft journalled at its ends in the rearwardly projecting end of said brackets and relatively large wheels carried by said shaft within the confines of said brackets and the sides of said bed frame, said wheels being supported above the floor and rearwardly of said bed when the bed is folded and supported in upright position upon said casters, and an upwardly and rearwardly projecting handle connected to the outer end of said last mentioned end section of said bed frame and above said wheels for transporting said folded bed when the latter is tilted from its upright folded position to wholly support the folded bed upon said large wheels with the casters elevated above the floor and when the bed is opened said wheels providing an intermediate support for the bed, said wheels being mounted within the sides of said bed frame to facilitate moving the folded bed through relatively narrow doorways or access openings when in tilted position.

2. In a roll-away bed as set forth in claim 1 in which the end section carrying the wheels and handle is of substantially greater length than the other end section, and when the bed is opened said wheels and handle provide supporting means for the open bed.

3. In a roll-away bed as set forth in claim 1 in which said wheels and handle provide supporting means for the bed upon the floor when the articulated end sections are opened to extended position to form a bed, and in which open position said casters are elevated from the floor.

References Cited in the file of this patent

UNITED STATES PATENTS

| 402,239 | Graham | Apr. 30, 1889 |
| 676,384 | Haberman | June 11, 1901 |
| 1,167,123 | Sinclair | Jan. 4, 1916 |
| 1,841,648 | Sorey | Jan. 19, 1932 |
| 2,607,050 | Binschoff | Aug. 19, 1952 |
| 2,699,557 | Gravatt | Jan. 19, 1955 |

FOREIGN PATENTS

| 269 | Great Britain | 1853 |
| 48,640 | Switzerland | July 15, 1909 |
| 15,166 | Great Britain | 1915 |
| 269,646 | Italy | Nov. 27, 1927 |
| 131,068 | Austria | Dec. 27, 1932 |